United States Patent [19]
Smith

[11] Patent Number: 5,694,821
[45] Date of Patent: Dec. 9, 1997

[54] METHOD FOR CONTROLLING WORK FEED RATE FOR CUTTING WOOD, METAL AND OTHER MATERIALS

[75] Inventor: H. Reid Smith, Kooskia, Id.

[73] Assignee: Simonds Industries, Inc., Fitchburg, Mass.

[21] Appl. No.: 569,518

[22] Filed: Dec. 8, 1995

[51] Int. Cl.$^6$ .............................. B23Q 15/00; B26D 5/00
[52] U.S. Cl. .................. 83/13; 83/56; 83/72; 364/474.3
[58] Field of Search ........................... 83/13, 72, 74, 83/76, 76.8, 76.9, 76.1, 76.6, 76.7, 789, 56; 364/474.3, 474.34

[56] References Cited

U.S. PATENT DOCUMENTS

| | | | |
|---|---|---|---|
| 3,680,417 | 8/1972 | Wells | 83/74 |
| 3,715,946 | 2/1973 | Kaltenbach | 83/72 |
| 4,085,636 | 4/1978 | Eklund | 83/74 X |
| 4,358,974 | 11/1982 | Sakurai | 83/74 X |
| 4,437,367 | 3/1984 | Hauser | 83/13 |
| 4,620,465 | 11/1986 | Taguchi | 83/74 |
| 4,644,832 | 2/1987 | Smith | 83/72 |
| 4,700,597 | 10/1987 | Taguchi | 83/74 X |
| 4,926,917 | 5/1990 | Kirbach | 83/76.8 X |

OTHER PUBLICATIONS

Airmar Technology Corp. Ad for Ultrasonic Transducers for OEMs Published in Sensors (May, 1995).
Migatron Corp. AD for Ultrasonic Sensors Published in Sensors (9 May, 1995).
Leica AD for Data Disto Electronic Distance Measurement Published in Sensors (Nov., 1995).
I.T.C. AD For Ultrasonic Transducers Published in Sensors (Nov., 1995).
International Knife & Saw, Inc. Brochure, entitled Saw-Blade Deviation Detector and Sawing Operation Rationaliser and the Blade Watcher BE 200.
Rod's Electronics Brochure on the Joro–Tester.

*Primary Examiner*—Eugenia Jones
*Attorney, Agent, or Firm*—Frank J. Dykas

[57] ABSTRACT

A positioned sensing device measures and/or calculates the lateral position and movement of a saw blade. These measured and calculated values are used to automatically alter the work-feed rate and/or saw blade rim speed either up or down as sawing conditions change within the work piece or between different work pieces.

12 Claims, 5 Drawing Sheets

METHOD FOR CONTROLLING WORK FEED RATE FOR CUTTING WOOD, METAL AND OTHER MATERIALS

BACKGROUND OF THE INVENTION

1. Technical Field

This invention relates to circular saw and bandsaw machines, and incorporates a method of controlling the rate at which work is fed into the saw blade based upon performance of the saw blade within predetermined levels of stability.

2. Background

Circular saw and bandsaw machines have long been used as economical means for cutting wood, metal and other materials. In recognition of the high costs for raw material and labor, automatic/computer control of work feed rates and sawing accuracy becomes of paramount importance. Optimized automatic control of work feed rates and saw blade stability keeps material and production costs down. The use of thinner saw blades and smaller rough sawn dimension sizes can conserve natural resources in the wood products industry, and reduce material waste in all industries which use circular saw and bandsaw machines in the manufacturing process. In the lumber industry, current production methods result in a larger than necessary amount of waste in order to manufacture finished dimension lumber. Reduction of this waste requires the solution of several technical problems.

The first problem is the rate at which the work is fed into the saw blade. The work is either manually or automatically fed into these sawing machines. In manually fed machines, the operator listens to the sound of the saw blade and varies the feed rate by judgment, frequently not realizing that the saw blade is being overfed. Sawing machines having automatic feed systems, use predetermined feed rates as a function of thickness of work (depth of cut). These predetermined feed rates do not consider any variable except depth of cut. This automatic feed system permits overfeeding and in some cases underfeeding of the saw machine, resulting in erratic lateral movement of the saw blade and loss of control of the saw line. Slower than optimum feed rates are required to compensate for the variable densities of wood encountered from summer to winter, density changes within the same log, partially frozen logs, and the sharpness of the saw blade cutting teeth. The variables all require on-line adjustments to work feed rates.

The second problem is the target size of the rough sawn work, which must be maintained large enough so that finished lumber is not undersized. This excess material, which is later removed to produce finish dimension lumber, represents waste. Uncontrolled lateral deviations in the saw lines during the cutting operation require larger rough sawn target sizes. These saw blade movements have several causes: misalignment of saw blade guides, normal saw blade tooth wear, bending or uneven dulling of saw teeth, and knots in the saw log. These typical conditions can cause lateral instability of the saw blade, with resultant deviations of the saw line.

The third problem is offsetting of the saw blade from the desired saw line. If the saw teeth are dulled by sand, gravel or other foreign objects embedded within the material being cut, offsetting the saw line from minor deviation of 0.005 to a major of 0.080 of an inch. When a saw blade runs in an offset condition and encounters a knot, or is substantially over-fed, it is possible for the saw blade to run completely out of the work. This ruins the saw blade tension, requiring hours of bench work to bring the saw back into proper tension so that it will again cut straight and accurately. The saw blade could also disintegrate, destroying itself and surrounding equipment, thus requiring down time to repair the damage. The safety of personnel is also placed in jeopardy if the saw blade disintegrates.

The fourth problem is the width of the saw cut, or kerf. Reduction of the saw blade gauge/thickness, and of side clearance, (the distance the tooth extends beyond the side of the saw blade body), decreases the width of the kerf. Heavier gauges and larger side clearance are currently used to protect the saw from the instability effects of excessive feed rates.

The fifth problem encompasses other considerations that directly affect optimized cutting efficiency, such as saw blade design, saw blade strain, and guide pressure.

At the present time, these considerations are being addressed by using larger rough sawn lumber target sizes, thicker saw blades, and larger kerf dimensions. Numerous attempts through the years have been made to solve these problems, with varied success.

1. Saw blade strain devices such as weight and lever or high strain pneumatic systems have improved saw blade performance. Some improvement in saw blade stability has been obtained, and higher feed rates achieved.

2. The use of pressure guides provides an additional increment of saw blade stability. These devices are commonly used in the wood products industry.

3. A control system utilizing the saw blade sagging angle in the direction of the work feed was the basis for U.S. Pat. No. 4,437,367, which was issued to Karl Hauser. This system works well in small bandsaw machines, but will not function adequately with the larger bandmill machines which have wider saw blades. This patent applies to bandsaw machines that hinge and move to the work in lieu of the work feed system common in larger sawing machines in which the work is fed into the machine.

4. Utilizing the pressure imposed by the work on the back of the saw blade to control work feed rates, as in U.S. Pat. No. 3,680,417 issued to John R. Wells, has merit when using small bandmill machines which use throw-away saw blades. Large bandsaw machines have blade widths exceeding two inches, and the same problems exist with this patent as with the saw blade sagging angle control system.

5. Utilizing a control system as shown in my U.S. Pat. No. 4,644,832, which uses a mean or averaged signal proportional to the lateral position of the saw blade for slowing down the depth of cut entry speed. This patent allows for the work entry feed speeds to be set higher than normal and the control logic to use "slow down steps" to reduce work feed speed in the event of unacceptable lateral movement of the saw blade. However, using this system, once a slow-down step has been made, the speed remains slowed down for the entire length of a log or cant being sawn, which lowers production output. This prior art does not address variable conditions within the same work piece, such as a log wherein the sawing conditions may vary significantly from one end to another, for example, from the butt end to the top end, as they relate to material density, sap rings, moisture content and even temperature.

In addition, my prior U.S. Pat. No. 4,644,832, does not take into consideration changes in zero reference signals which can change, in a 2-hour period, as much as 0.020 inches as a result of wear during cutting.

Finally, this prior art patent utilizes only processed signals, and in the event of significant lateral deviation of the saw blade, the prior art system does not react quick enough to prevent damage to the saw blade and/or the work piece because of the processing time required to condition the signals.

Accordingly, it is an object of this invention to provide a saw control system which is responsive to changing cutting condition so as to optimize saw cutting conditions.

DISCLOSURE OF INVENTION

These objects are achieved in a control system which continuously monitors the lateral displacement of the sawing blade from its designed straight line position by means of a sensor which is installed at a fixed known position relative to the blade. The signal is processed into an averaged signal proportional relative to a zero reference point, and thus proportional to the lateral motion of the blade for any given period of time. This signal is then compared to a plurality of reference signals to monitor the lateral position of the blade, and for purposes of adjusting the feed rate at which the material being cut is presented to the saw. The reference signals are provided in pairs, with the first being those proportional to a predetermined acceptable lateral motion range, followed by a first, second and third range reference signals. Since every sawing application is different, the set points for the reference levels are empirically determined for the particular application.

The work feed motor has a variable feed rate capability. An empirically determined table assigns to each depth of cut a thickness designation and an initial entry feed rate assignment. These entry feed rate assignments are either determined empirically or derived from existing tables published for most particular saw blade configurations. The greater the depth of cut, the slower the initial entry feed rate will be. Also provided are a plurality of increasing and decreasing feed rate steps for each initial entry feed rate. These steps can be fixed or percentage based so that the greater the depth of cut, the less the feed rate step increases, and the smaller the depth of cut, the greater the increases and decreases.

Prior to the material being cut being presented to the saw blade, it is first passed through a depth of cut thickness measurement device, where the thickness is measured and compared to the entry feed rate table and the appropriate initial entry feed rate is selected.

As the material engages the saw blade, the lateral position of the saw blade is continuously monitored by a sensor and compared to the acceptable lateral motion reference signals. If the blade motion signal remains within the acceptable lateral motion signals for a predetermined period of time, then the output to the work feed motor will be increased one step. This sequence of events will continue as long as the lateral position of the saw blade remains within the acceptable lateral motion range. If the lateral position of the saw blade moves outside of the acceptable lateral range, but not above or below the first reference point, then the increase in feed rate steps will stop. If the lateral position of the saw blade moves beyond the first reference range, the controller will signal the work feed motor to drop its operating speed one step. If the lateral position of the saw blade remains outside of the first reference range for a specified period of time after dropping a speed step, the controller will signal the work feed motor to continue dropping steps until the lateral saw blade motion drops within the acceptable lateral motion range.

If the raw wave signal from the sensor indicates that the lateral motion of the second reference point range, the feed rate signal from the controller will automatically drop a predetermined number of steps, depending upon a preselected set point parameter.

If the raw wave signal from the sensor indicates that the saw blade has moved laterally past a third reference point, then the controller will signal the work feed motor to immediately drop in feed rate to a slow speed to the depth of cut being sawn.

In a like manner, the controller can be used to step up or down the blade drive motor and thus provide adjustments for tip speed for the blade.

The position of the saw blade is also monitored, using the sensor. During those periods of time when the saw blade is not cutting, these readings are used to periodically reset the initial zero reference point so as to compensate for changes in position resulting from wear on the saw and guide blocks.

BEST MODE FOR CARRYING OUT INVENTION

It is an object of the present invention to optimize production of cutting products. To do this, it is necessary to understand the sawblade cutting process and to adjust sawblade rim speed and/or feed speed to ensure that optimal straight light cuts are achieved at the fastest possible rate. Reference is made to prior art FIGS. 1 and 2. Prior art FIG. 1 discloses a section of a band saw cutting blade 30 which is formed of body 32 and teeth 34. The dynamics of band saw cutting will be described in this preferred embodiment in the context of a band saw cutting dimensional lumber from a log or cant. However, it should be understood that the dynamics of cutting with other materials are essentially the same, as are the dynamics of cutting with a radial saw, as opposed to a band saw. The processes in the control system described herein apply equally well to the cutting of other materials, including metal, polymers, rods, silicates, and virtually any material which is capable of being cut.

Figure 1:
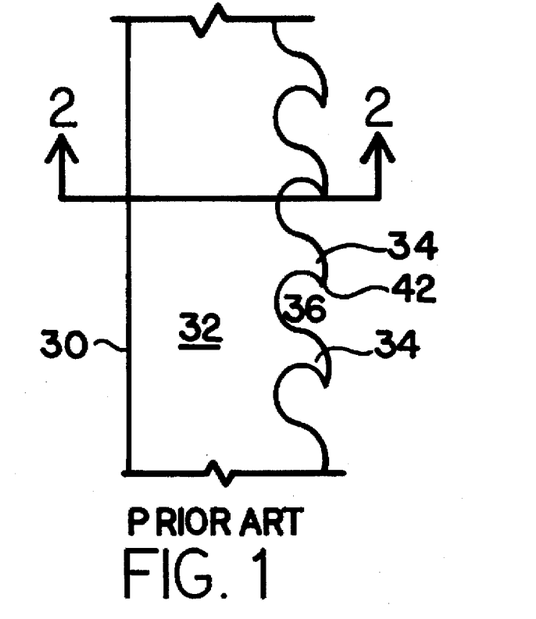
FIG. 1 is a sectional side view of a typical prior art band saw blade.
Figure 2:
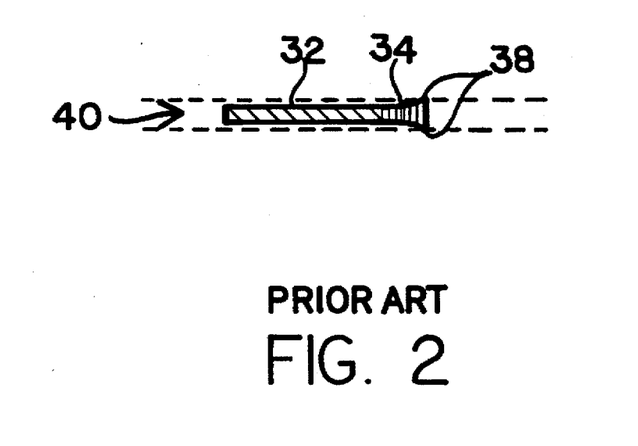
FIG. 2 is a sectional top view of the band saw blade taken along plane 2—2.

Again, referring to prior art FIGS. 1 and 2, ideally, as the material is being fed into the cutting teeth of the band saw, tips 42 of teeth 34 chip away at the material being fed into it, with the chips, which in this example are wood chips, or sawdust, collecting in the gullet 36 which is the area defined between adjacent teeth 34. For optimal cutting, the teeth 34 and gullet 36 should clear or exit the material being cut just as the gullets are nearing completely full. If the material to be cut is fed too slowly, the gullets 36 will remain partially empty, and the saw is capable of cutting or biting into the material at greater distance during its pass through the material as it is being cut. If the material to be cut is being fed in too fast, gullets 36 will fill before the adjoining teeth exit the material and, as a result, the chipped material or sawdust will be forced out along side body 32 of band saw blade 30.

Although there are a number of different designs for band saw and circular saw blades, the typical band saw blade used in cutting dimensional lumber has, as shown in prior art FIG. 2, has swaged teeth with swaged tips 38, thus forming a wider tip at 38 than the body 32 of the blade. The width of the cut is called the kerf, and is shown as 40 in the prior art FIG. 2. The purpose of this is to reduce abrasion of body 32 as it passes through the material being cut. If the material feed rate into the blade is too high, and gullets 36 fill, this excess material will be pushed out along side body 32 and cause rapid and unacceptable wear and heat deformation. Also, if the gullets fill too early and material is forced out from the gullets, it may be forced out along one side of the blade and not the other, thus causing the body 32 of blade 30 to become angled within the kerf 40, and thereby cause a deviation from a straight line cut.

Thus, the two primary factors which must be optimized in order to optimize the cutting process are the speed of the blade and the rate at which material is fed into it.

These factors are strongly influenced by the conditions and overall dimensions of the material being cut. For example, a typical band saw may be used to cut a typical log which is, at its base is 18" in diameter, and at its opposite end, only 12" in diameter. The same log may be much denser at its base than at its opposite end, dryer at one end or the other, or even of a different temperature from one end to the other. The greater the diameter of the log, the greater the depth of cut, and for a given fixed saw blade tip speed, the log must be fed more slowly into the blade in order to optimize cutting performance. Yet, if a constant speed is maintained over the length of the entire log, the slower speed required for optimal cutting at the 18" base may be much slower than that which would be permissible for optimal cutting at the smaller diameter, less dense opposite end.

Another set of factors which affect optimal cutting speed is the condition or characteristics of the material being cut. With logs, it is not uncommon, at the base of the log, to have the grain of the wood and the sap rings angling out from the center line or longitudinal axis of the log. Thus, as the saw blade passes through the log parallel to the longitudinal axis of the log, it is encountering alternating rings of wood fiber and sap rings and, as a result, varying densities of material to be cut. This can result in unequal forces on the swage tips 38, which can again displace the blade from its straight-line path, and cause an angled or non-straight cut.

In a like manner, when the saw blade encounters knots in the log, the same conditions can occur which cause the blade to deviate from its straight-line path.

Ultimately it is the displacement of the blade from its straight line position which results in the non-straight cuts and, for that reason, in the present invention and as discussed in this preferred embodiment, it is the detecting of the lateral displacement of the blade from its designed straight line position which indicates that optimal cutting conditions no longer exist.

Figure 3:
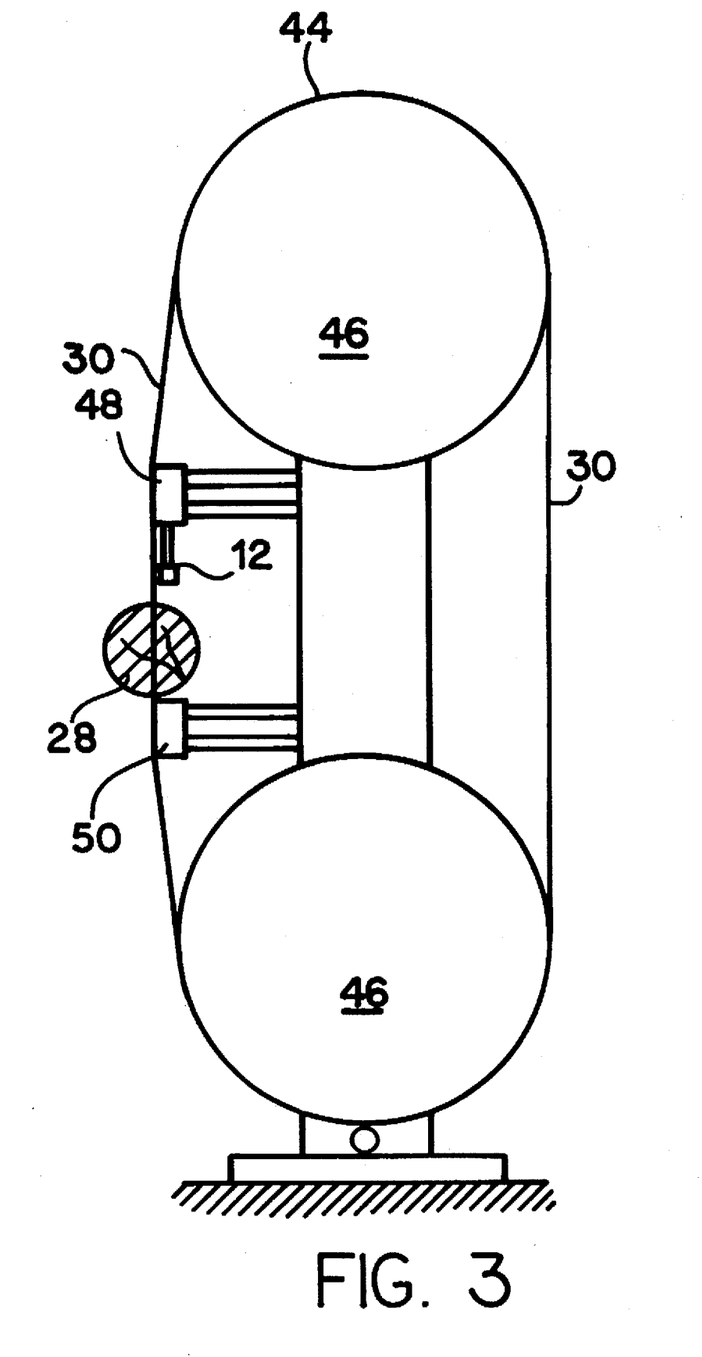
FIG. 3 is a schematic representation of a typical band saw showing the sensor position.

In the preferred embodiment, as shown in FIG. 3, saw blade 30 for band saw 44 is stretched around two opposing band saw wheels 46, and tensioned and guided, in the cutting area, by means of upper and lower guide blocks 48 and 50. A sensor, 12, which is, in the preferred embodiment, is an electromagnetic proximity sensor which senses eddy current, and thus the distance of a sensor to a metallic object. This is used to detect the lateral position of band saw blade 30. In the preferred embodiment, sensor 12 is an electromagnetic proximity sensor developing a 50 MH RF envelope which is affected by the proximity of a moving metal blade. This proximity sensor 12 can thus generate a signal indicating the lateral position of blade 30 relative to itself. Proximity sensor 12 is installed in a fixed, known position and is attached to the sawing machine frame and/or foundation. In the preferred embodiment, sensor 12 can be attached to either of guide blocks 48 or 50, with the preferred attachment attached to the bottom of the upper guide block which is in a position over the top of the material being cut. An alternate position is attached to either side of the lower guide block 50. In some cases, when the distance between the guide blocks 48 and 50 is more than 4 times the width of the band saw blade, having both a top and a bottom sensing means is desirable. The sensor may also be affixed so the distance below the guide block between the work and the edge of the saw guide produces a number that represent a one to five times multiple of the sensed sawblade lateral position within the work being sawn. This ratio is the relationship between the sensing means movement and the actual movement of the saw within the work. In the preferred mounting, this requires that the top saw guide block 48 be positioned far enough above the work so that the sensor 12 obtains superior representation of sawblade lateral movement within the work. The sensor means must be mounted so it senses the movement closest to the saw teeth or just behind the gullets. In case of a double-cut machine, a sensor is used for both front and back of the saw blade.

Figure 4:
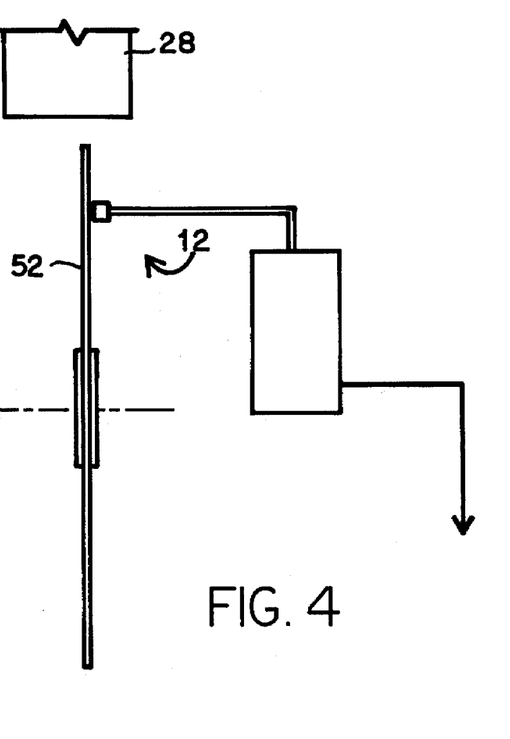
FIG. 4 is a schematic representation of a typical circular saw blade configuration showing motion sensor position.

In a circle saw machine application, such as that shown in FIG. 4, the sensor 12 is attached to the machine frame, preferably in a radial location equidistant from the entrance and exit of and adjacent to circular saw blade 52. Sensor 12 is also placed, as with the band saw machine, not more than one diameter of the sensor behind the gullets of the blade.

Figure 5:
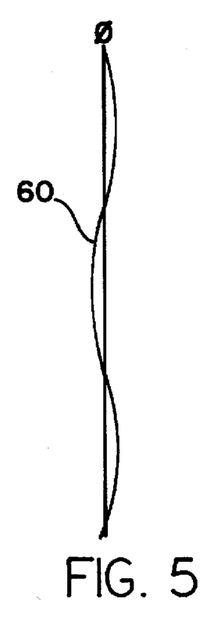
FIG. 5 is a schematic representation of a lateral motion, raw wave signal for a band saw blade when not engaged in cutting.
Figure 6:
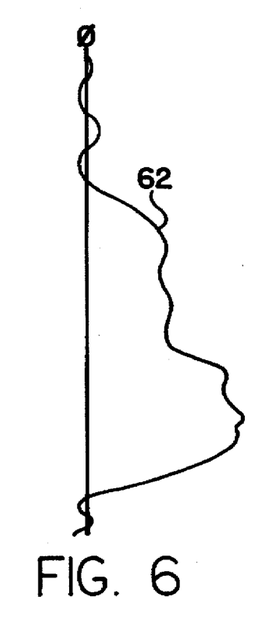
FIG. 6 is a schematic representation of a lateral motion raw wave signal for a band saw engaged in cutting.
Figure 7:
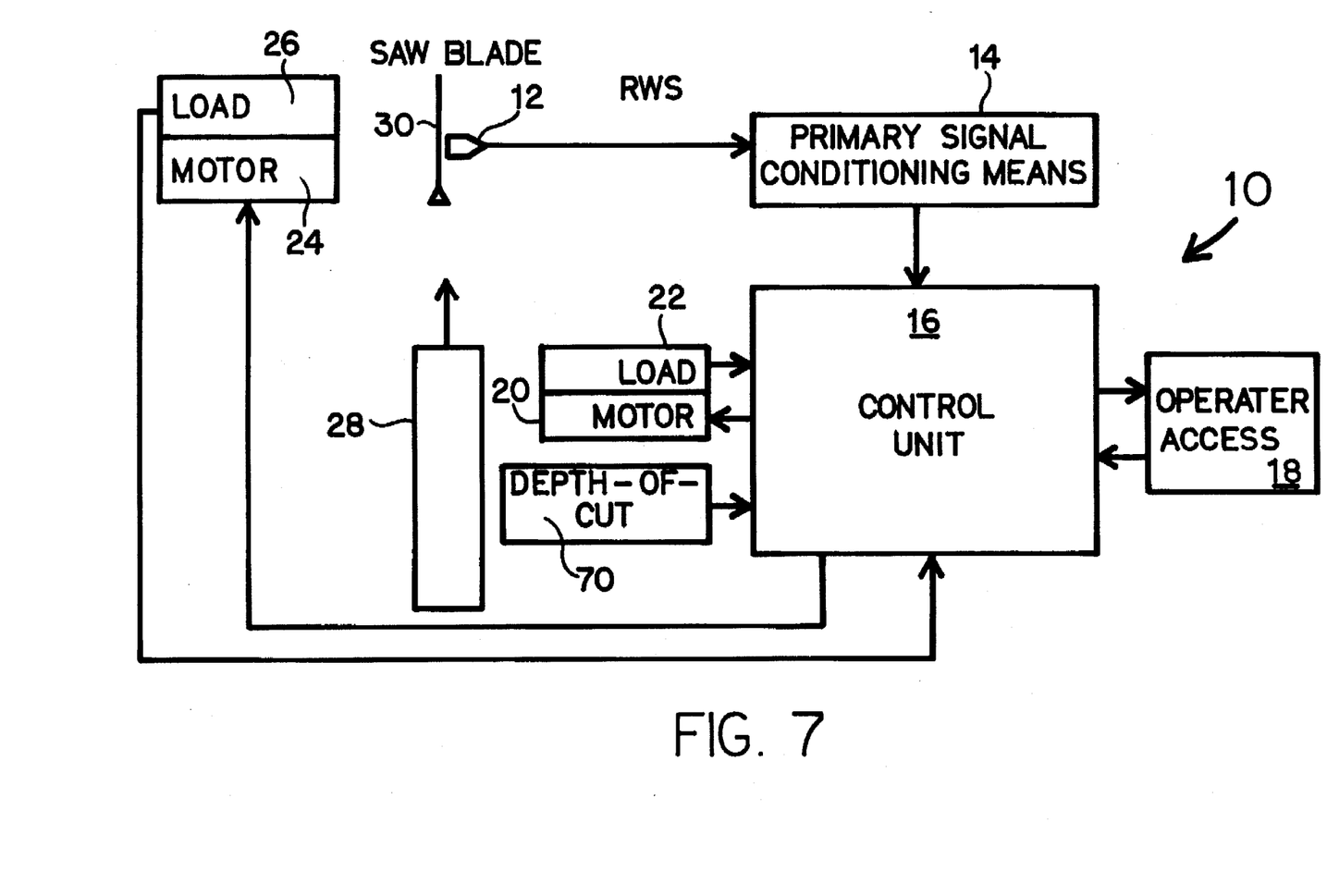
FIG. 7 is a schematic representational block diagram of the control system.

When band saw 44 is operating, and not cutting, there may typically be a small amount of lateral movement of the blade from its zero reference or stationary position. This typically will be a sinusoidal type of oscillation of minimal measurement, and is shown in representational format in FIG. 5. When the band saw is actually cutting material, its lateral displacement and oscillations are considerably more complex due to the various factors discussed above. The raw wave signal, from sensor 12, would correspond, during cutting conditions, to a path more or less similar to representational cutting lateral displacement path 62, as shown in FIG. 6. This raw wave signal is sent from sensor 12 to primary signal conditioning means 14 as shown in FIG. 7, in which a proportional electrical signal representing the reference position of the saw blade is generated. This primary signal conditioning means 14 can be incorporated into either sensor 12 or incorporated within the control unit 16. The configuration may change to accommodate advances in technology without changing the function or logic of the invention. This signal can now be used for direct feed rate logic control and further mathematically calculated into mean or average position and peak-to-peak vibration, and RMS values for additional control. These separate signals, reduced to engineering units of measurement, are now ready to be used in the control logic.

In the preferred embodiment, the signal conditioning means 14 is used to average the raw signal being sent by sensor 12. There are, in this preferred embodiment, two averagings occurring, the first being the average lateral displacement absolute values in both the plus and minus directions from the zero reference point, and second, an averaging over time of the continuous signals being received from sensor 12. In the preferred embodiment, the time averaging occurs between ten milliseconds to two hundred milliseconds, depending upon the application. The purpose is to avoid having the control system react to non-harmful transients, such as for example, the blade encountering a small knot in the log.

The control unit 16 can incorporate means such as a central processing unit, computer, microprocessor or other programmable logic controller. The operator access unit 18 allows the operator to examine and change control parameters and set points.

Figure 8:
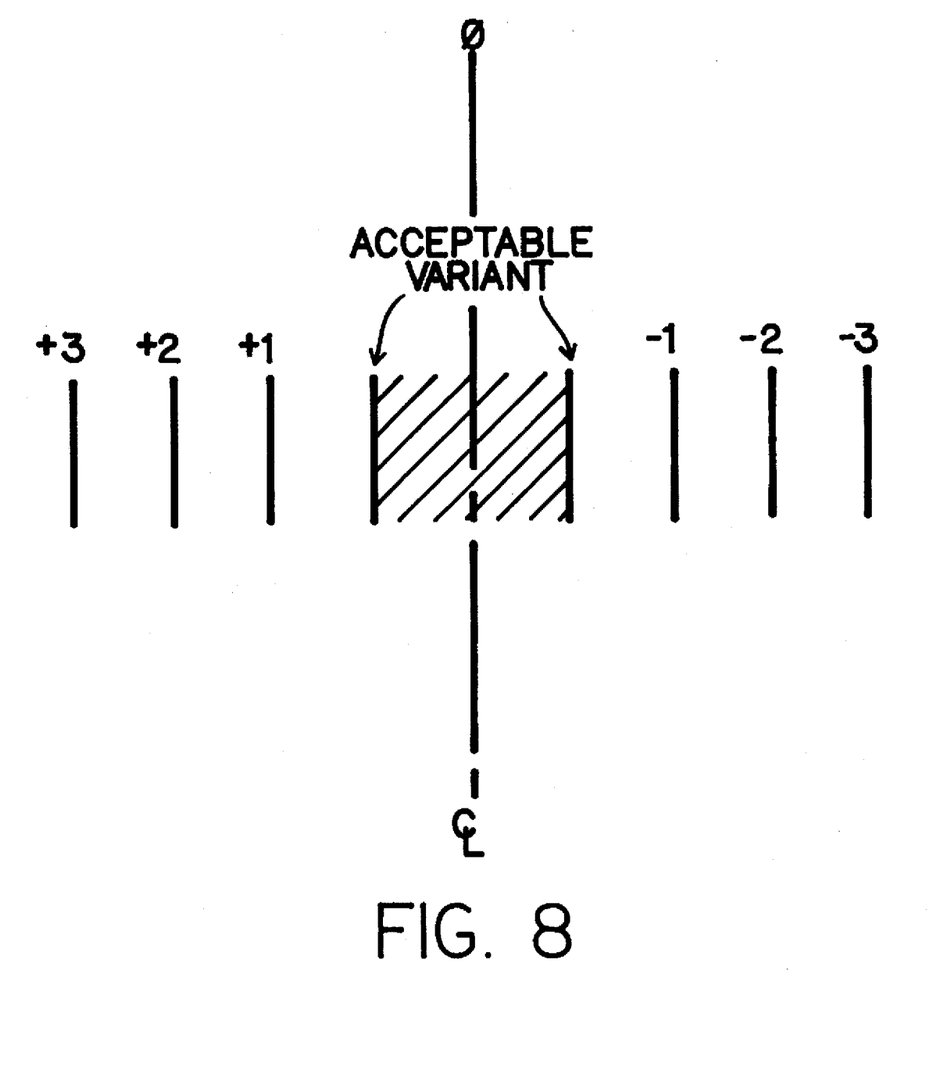
FIG. 8 is a schematic representation of the acceptable band width, and the first, second and third reference signals.

The control unit 16 contains several pairs of control set points. As shown in FIG. 8, these set points are on either side of the zero reference or center position, having both a positive and a negative setting. The first set points are labeled the range of acceptable lateral motion; the next set points the +1 and −1 range; the next set points +2 and −2 range, followed by the +3 and −3 range. Additional ranges can be added as necessary. Every sawing application is different and requires set points to be set at different levels. For example, the +3 or −3 level can be ten to twenty times greater than the acceptable lateral motion level.

The work feed motor 20 has variable feed rate capabilities. An empirically determined table assigns to each depth of cut, a thickness designation and an initial entry feed rate assignment. These entry feed rate assignments are either determined and set empirically or derived from existing tables published for most particular saw blade configurations. The greater the depth of cut, the slower the initial entry feed rate will be. Along with the entry feed rate, there are provided a plurality, which in the preferred embodiment is four or more, increasing feed rate steps and four or more decreasing feed rate steps. These steps can be fixed or percentage based, so that the greater the depth of cut, the less the feed rate step increases, and the smaller the depth of cut, the larger the step increases.

In a depth of cut feed rate sawing machine application, the normal continuous sequence of events for the controller system as follows:

The work, which in this description of the Best Mode is a log 28, passes through a depth of cut thickness measurement means 70 prior to feed entry into the saw blade so that its thickness is measured and compared to a predetermined entry feed rate table and the appropriate output value is sent to the work feed motor 20 to move the log or into the saw blade at the appropriate predetermined speed. The depth of cut or thickness measurement means 70 is typically a set of optical sensors, or other devices, all of which are well known in the art.

As log 28 engages saw blade 30, the lateral position of saw blade 30 is continuously sensed by sensor 12 and compared to the reference signals identified as the acceptable lateral motion signals in FIG. 8. These reference signals are proportional to the blade motion signal that would be generated at predetermined acceptable lateral movement of the saw blade.

The averaged blade-motion signal is then compared to the zero reference signal and the acceptable lateral motion or first reference signals. If the blade motion signal remains within the acceptable lateral motion reference signals for a period of time, for example, twenty-five milliseconds or one hundred fifty milliseconds, then the output to the work feed motor 20 will be increased one step. This loop continues at specified time intervals as long as the lateral position of the saw blade, as indicated by the generated blade motion signal, is in the acceptable lateral motion range, until the highest feed rate step for this depth of cut is reached.

If the lateral position of the saw blade, as indicated by the generated blade motion signal, moves outside of the acceptable lateral motion range, but not above or below the +1 or −1 or first reference point range, the increase in feed rate steps will stop. As long as the lateral position of the saw blade remains between the acceptable lateral motion and the +1 or −1 range, the feed rate remains at its obtained setting.

If the lateral position of the saw blade, as indicated by the generated blade motion signal crosses beyond the either +1 or −1 or first reference point range, the control unit 16 will send a signal to the work feed motor 20 to drop its operating speed one step. If the lateral position remains outside of the +1 or −1 range for a specified period of time, for example, one hundred milliseconds, the controller 16 will signal the work feed motor 24 to drop another step. This process will continue until lateral saw blade motion drops within the acceptable lateral motion range again.

If the lateral position, as indicated by the generated proportional blade motion signal crosses into the +2 or −2 or second reference point range, the feed rate signal from the controller will automatically drop one, two or three steps, depending upon the pre-selected set point parameter.

The primary signal conditioning means 14 also monitors and maintains the raw wave signal being provided from sensor 12, without averaging over time, but rather in a peak-to-peak absolute value configuration. If, in the preferred embodiment, the raw wave signal passes over the value of the third plus or minus reference signals, then controller 16 will signal the work feed motor 24 an immediate drop in feed rate to the slowest speed for the depth of cut being sawn. In this manner, the speed steps can only cycle up one at a time, but can move from the top step to the lowest step in one jump if the raw wave signal exceeds the third reference value. This is done as a safety precaution, since the raw signal can be processed much quicker than the time averaged blade motion signal.

In this manner, the control system operates within the established set points to cycle the feed speed steps up or down according to the lateral position of the saw blade. These steps change the control feed rate both above and below the entry rate, including a return to the entry rate as one of the steps.

In a like manner, control unit 16 can be used to step up or down saw blade drive motor 24 and thus provide adjustment for the tip speed for blade 30.

Another control consideration, depending upon the application, is the optional monitoring of both the work feed motor load monitor 22 and saw blade motor load monitor 26 to monitor load amps or horsepower usage. Set points for maximum amps can then be used to either inhibit feed rate increases or drop the feed rate one step, and in a like manner inhibit or increase blade speed one step. If a chipper or slabber is utilized in series with the saw blade assembly, a load measurement means can also be provided to control the speed rate steps of these machines in the same manner as the saw blade and feed rate motors.

As normal wear occurs on band saw 44 and upper and lower guide blocks 48 and 50, the distance between sensor 12 and band saw blade 30 can change. This wear can easily amount to as much as ten thousandths of an inch per hour. This type of wear can alter the position of the zero reference set point, and, in many applications, can drastically affect the effectiveness of the calibrations of the first, second and third reference points. To automatically compensate for this wear, the zero reference point is periodically recalibrated, and thus the values of the acceptable lateral motion, first, second and third reference points are updated. This is accomplished by monitoring the position of the saw blade, using sensor 12, during those time periods when material is not being fed into the saw and the saw is not cutting. At the beginning of the work cycle, this first detection of location of the saw blade, when not engaged in sawing material, is used to establish the initial zero reference point. Thereafter, in the preferred embodiment, each time the saw is not working or engaged in sawing material, its location is monitored by sensor 12 and saved in controller 16. Averages of the stored readings are then taken, in the preferred embodiment, every five minutes. This average is then compared with the readings of the then current zero reference value, and if different, the zero reference value is reset as needed.

While there is shown and described the present preferred embodiment of the invention, it is to be distinctly understood that this invention is not limited thereto but may be variously embodied to practice within the scope of the following claims.

I claim:

1. A method for controlling a feed rate of material to be cut by a saw blade which comprises:

establishing a zero reference point for a lateral position of the saw blade;

detecting lateral movement of the saw blade away from the zero reference point when the saw blade is cutting material being fed into the saw blade;

generating a signal proportional to the detected lateral movement of the saw blade;

establishing a reference signal proportional to the proportional signal generated at a pre-selected acceptable lateral movement of the saw blade;

comparing the generated signal to the reference signal, and if the generated signal is less than the reference signal, then increasing the feed rate, and if the generated signal is greater than the reference signal, then decreasing the feed rate.

2. The method of claim 1 wherein the step of establishing a zero reference point for the lateral position of the saw blade further comprises:

detecting the location of the saw blade when it is not engaged in sawing material to establish an initial zero reference point;

generating an initial lateral position proportional to the initial position of the saw blade;

again detecting an updated location of the saw blade when it is not engaged in sawing material;

generating an updated lateral position signal proportional to the position of the saw blade when not engaged in work; and resetting the zero reference point to conform to the updated lateral position signal.

3. A method for incrementally controlling a feed rate of material to be cut by a saw blade which comprises:

establishing a zero reference point for a lateral position of the saw blade;

detecting lateral movement of the saw blade away from the zero reference point when the saw blade is cutting material being fed into the saw blade;

generating a blade motion signal proportional to the detected lateral movement of the saw blade;

establishing a first reference signal proportional to the blade motion signal generated at a pre-selected acceptable lateral movement of the saw blade;

generating a second reference signal proportional to the blade motion signal generated at a first level of unacceptable lateral movement of the saw blade;

comparing the blade motion signal to the first and second reference signals, and if the blade motion signal is less than the first reference signal, then increasing the feed rate one increment, and if the blade motion signal is greater than the second reference signal, then decreasing the feed rate one increment.

4. A method for incrementally controlling a feed rate of material to be cut by a saw blade which comprises:

establishing a zero reference point for a lateral position of the saw blade;

detecting lateral movement of the saw blade away from the zero reference point when the saw blade is cutting material being fed into the saw blade;

generating a blade motion signal proportional to the average detected lateral movement of the saw blade over a pre-selected period of time;

establishing a first reference signal proportional to the blade motion signal generated at a pre-selected acceptable lateral movement of the saw blade;

generating a second reference signal proportional to the blade motion signal generated at a first level of unacceptable lateral movement of the saw blade;

comparing the blade motion signal to the first and second reference signals, and if the blade motion signal is less than the first reference signal, then increasing the feed rate one increment, and if the blade motion signal is greater than the second reference signal, then decreasing the feed rate one increment.

5. The method of claim 4 which further comprises:

generating a third reference signal proportional to the blade motion signal generated at a second, higher level of unacceptable lateral movement of the saw blade;

comparing the blade motion signal to the third reference signal, and if the blade motion signal is greater than the third reference signal, then decreasing the feed rate at least two increments.

6. The method of claim 5 which further comprises:

generating a fourth reference signal proportional to the blade motion signal generated at a third higher level of unacceptable lateral movement of the saw blade;

comparing the actual detected lateral movement of the saw blade away from the zero reference point to the fourth reference signal, and if greater than the fourth reference signal, then decreasing the feed rate to the lowest available feed rate for the material being cut.

7. A method for controlling a rim speed of a saw blade which comprises:

establishing a zero reference point for a lateral position of the saw blade;

detecting lateral movement of the saw blade away from the zero reference point when the saw blade is cutting material being fed into the saw blade;

generating a signal proportional to the detected lateral movement of the saw blade;

establishing a reference signal proportional to the proportional signal generated at a pre-selected acceptable lateral movement of the saw blade;

comparing the generated signal to the reference signal, and if the generated signal is less than the reference signal, then increasing the rim speed, and if the generated signal is greater than the reference signal, then decreasing the rim speed.

8. The method of claim 7 wherein the step of establishing a zero reference point for the lateral position of the saw blade further comprises:

detecting the location of the saw blade when it is not engaged in sawing material to establish an initial zero reference point;

generating an initial lateral position proportional to the initial position of the saw blade;

again detecting an updated location of the saw blade when it is not engaged in sawing material;

generating an updated lateral position signal proportional to the position of the saw blade when not engaged in work; and resetting the zero reference point to conform to the updated lateral position signal.

9. A method for incrementally controlling a rim speed of a saw blade which comprises:

establishing a zero reference point for a lateral position of the saw blade;

detecting lateral movement of the saw blade away from the zero reference point when the saw blade is cutting material being fed into the saw blade;

generating a blade motion signal proportional to the detected lateral movement of the saw blade;

establishing a first reference signal proportional to the blade motion signal generated at a pre-selected acceptable lateral movement of the saw blade;

generating a second reference signal proportional to the blade motion signal generated at a first level of unacceptable lateral movement of the saw blade;

comparing the blade motion signal to the first and second reference signals, and if the blade motion signal is less than the first reference signal, then increasing the rim speed one increment, and if the blade motion signal is greater than the second reference signal, then decreasing the rim speed one increment.

10. Method for incrementally controlling a rim speed of a saw blade which comprises:

establishing a zero reference point for a lateral position of the saw blade;

detecting lateral movement of the saw blade away from the zero reference point when the saw blade is cutting material being fed into the saw blade at a known feed rate;

generating a blade motion signal proportional to the average detected lateral movement of the saw blade over a pre-selected period of time;

establishing a first reference signal proportional to the blade motion signal generated at a pre-selected acceptable lateral movement of the saw blade;

generating a second reference signal proportional to the blade motion signal generated at a first level of unacceptable lateral movement of the saw blade;

comparing the blade motion signal to the first and second reference signals, and if the blade motion signal is less than the first reference signal, then increasing the rim speed one increment, and if the blade motion signal is greater than the second reference signal, then decreasing the rim speed one increment.

11. The method of claim 10 which further comprises:

generating a third reference signal proportional to the blade motion signal generated at a second, higher level of unacceptable lateral movement of the saw blade;

comparing the blade motion signal to the third reference signal, and if the blade motion signal is greater than the third reference signal, then decreasing the rim speed at least two increments.

12. The method of claim 11 which further comprises:

generating a fourth reference signal proportional to the blade motion signal generated at a third higher level of unacceptable lateral movement of the saw blade;

comparing the actual detected lateral movement of the saw blade away from the zero reference point to the fourth reference signal, and if greater than the fourth reference signal, then decreasing the rim speed to the lowest available rim speed for the material being cut.

* * * * *